United States Patent [19]
Carson et al.

[11] Patent Number: 5,740,376
[45] Date of Patent: Apr. 14, 1998

[54] SIGNALING PROTOCOL FOR A PERIPHERAL COMPONENT INTERCONNECT

[75] Inventors: Dave Carson, Hillsboro; Bruce Young, Tigard; Norman Rasmussen, Hillsboro, all of Oreg.; Stephen Fischer, Rancho Cordova; Jeffrey Rabe, Fair Oaks, both of Calif.

[73] Assignee: Intel Corporation, Santa Clara, Calif.

[21] Appl. No.: 799,526

[22] Filed: Feb. 12, 1997

Related U.S. Application Data

[63] Continuation of Ser. No. 467,085, Jun. 6, 1995, abandoned, which is a continuation of Ser. No. 876,577, Apr. 30, 1992, Pat. No. 5,467,295.

[51] Int. Cl.$^6$ .................................................. G06F 13/372
[52] U.S. Cl. .......................... 395/281; 395/299; 395/306; 395/730; 395/822; 395/285
[58] Field of Search ........................... 395/287, 288, 395/285, 290, 293, 306, 307, 299, 305, 281, 730, 822

[56] References Cited

U.S. PATENT DOCUMENTS

| | | | |
|---|---|---|---|
| 4,148,011 | 4/1979 | McLagan et al. | 340/825.5 |
| 4,587,609 | 5/1986 | Boudreau et al. | 595/725 |
| 4,706,190 | 11/1987 | Bomba et al. | 395/425 |
| 4,719,569 | 1/1988 | Ludemann et al. | 364/729 |
| 4,763,249 | 8/1988 | Bomba et al. | 395/287 |
| 5,167,022 | 11/1992 | Bahr et al. | 395/325 |
| 5,185,865 | 2/1993 | Pugh | 395/275 |
| 5,265,211 | 11/1993 | Amini et al. | 395/856 |
| 5,274,784 | 12/1993 | Arimilli et al. | 395/325 |
| 5,276,818 | 1/1994 | Okazawa et al. | 395/325 |
| 5,280,623 | 1/1994 | Sodos et al. | 395/325 |

OTHER PUBLICATIONS

Digital Bus Handbook, Ed., Joseph D. Giacomo, 1990, USA pp. 2.1–3.30.

*Primary Examiner*—Dinh C. Dung
*Attorney, Agent, or Firm*—Blakely, Sokoloff, Taylor & Zafman

[57] ABSTRACT

A computer bus that enables bus mastering agents to send/receive a burst of data to/from a slave agent without determining in advance the number of data words to be transferred, or even the maximum number of data words that could be transferred. Either the master, the slave, or the bus arbiter can terminate the burst at any time with minimum overhead. Furthermore, either the master or the slave can throttle the speed of the data transfer by adding wait states. Distributed address decode is performed by each agent coupled to the bus. Each agent must claim a transaction directed toward it by the master. If no agent claims the transaction within a predetermined number of clock periods, a subtractive decode device may claim the transaction by default. The bus also includes a bus lock wherein each bus slave agent may be able to enter a locked state, and once in the locked state, reject all accesses except those initiated by the master agent that locked it. Signal line LOCK# is owned by only one master agent at a time. Although the LOCK# signal must be obtained by acquiring the bus while LOCK# is high, ownership of the line is maintained as long as LOCK# is held low. Therefore, a master agent can own the lock while another master uses the bus.

8 Claims, 11 Drawing Sheets

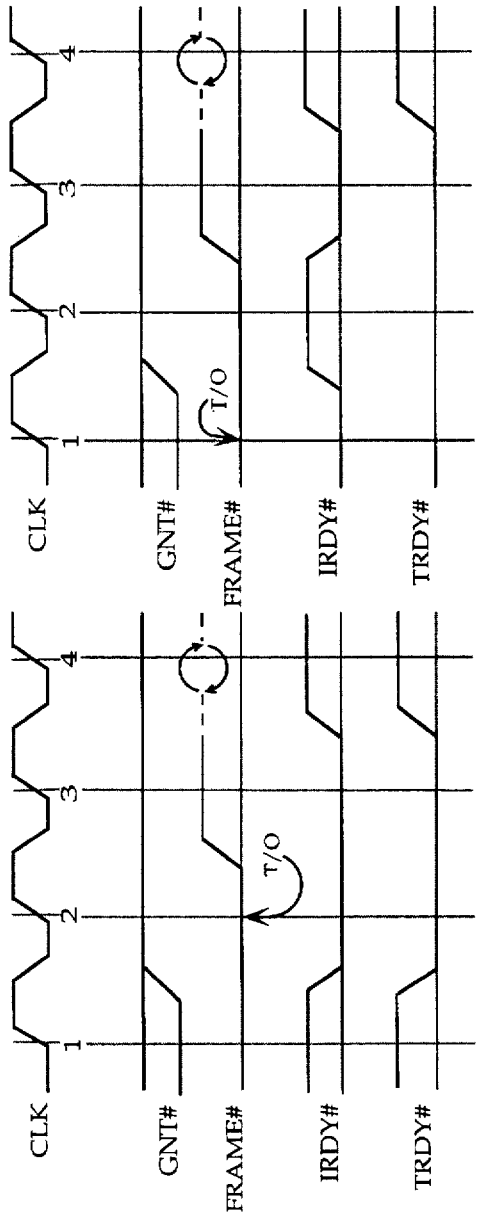
FIGURE 5
FIGURE 6
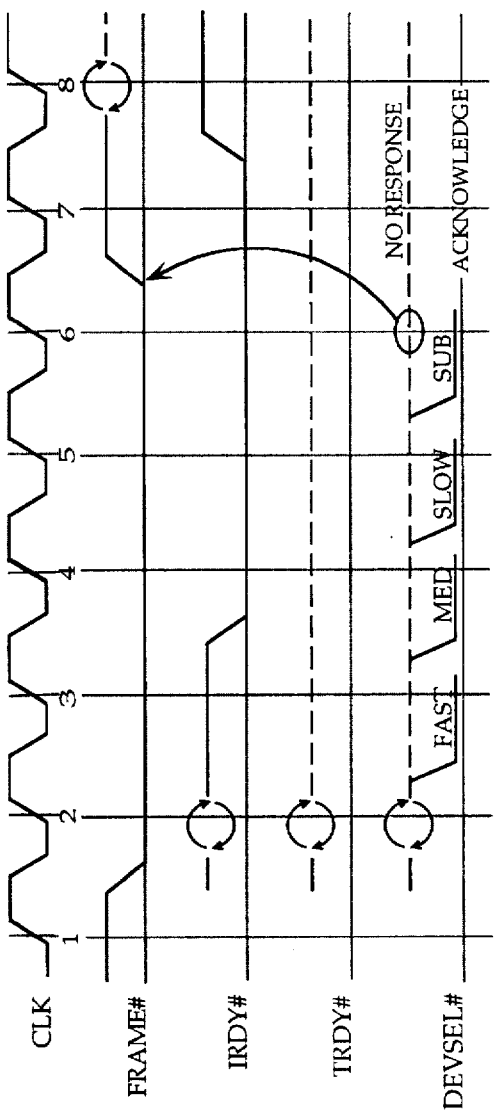
FIGURE 7

SIGNALING PROTOCOL FOR A PERIPHERAL COMPONENT INTERCONNECT

This is a continuation of application Ser. No. 08/467,085, filed Jun. 6, 1995, now abandoned, which is a continuation of application Ser. No. 07/876,577, filed Apr. 30, 1992, now U.S. Pat. No. 5,467,295 issued Nov. 14, 1995.

BACKGROUND OF THE INVENTION

(1) Field of the Invention

The present invention relates to a computer bus, and more particularly, to a method and apparatus for performing distributed address decode, transferring variable length data bursts and selectively locking resources coupled to the bus.

(2) Art Background

Computer data buses are used throughout the computer industry to transfer data between data processing resources ("agents") coupled to the bus. Personal Computers (PCs) were originally designed with a single bus structure to which all the resources of the computer were coupled. As PCs matured, some vendors added an additional bus for the CPU to communicate to memory at a higher speed. In the prior art, the addition of a memory bus required a centralized decoder to tell the memory when the transaction was addressed to the memory and to tell the standard bus when it should intercept the cycle. A distributed address decoding environment is more flexible, because it allows any number of devices to be coupled to the bus, without necessitating the configuration of a centralized resource which has a mapping of the memory and input/output (I/O) space addresses of each device.

Many large (non-PC) computer buses require read or write operations to be directed to an address of an agent which is coupled to the bus. If a read or write occurs to a non-existent address, these buses require that an error state occur and that corrective action be taken. However, it is common for PC software to perform dummy read or write transactions to non-existant addresses. Toward that end, distributed address decode creates a problem in determining that no device on the bus has been addressed, so that the access can be routed to the standard PC bus as required by the PC software paradigm.

As will be described, the present invention provides a method and address for performing distributed address decode on a bus thereby avoiding the requirement that there be a centralized decoder which has a mapping of the memory and I/O space addresses of each device coupled to the bus.

Furthermore, many computer buses in use today allow bursts of data to be transmitted to one or more agents. In most cases, the data burst must be of a specific length. A few buses do allow a master agent to notify the slave agent as to how many data words will make up the burst, and allow the slave to indicate that it cannot take or supply additional data. Although some point-to-point data links support streaming data types of potentially infinite length, few shared computer buses in use today allow for such a transfer. In most shared computer buses that permit data bursts, if the length of the data burst is not a standard size (i.e. a block transfer), the master and slave must negotiate the length of the burst before the transfer can occur. Then, if the transfer is interrupted, a catastrophic error will occur and the entire data burst must be repeated or the transfer aborted.

As will be described, the present invention allows an infinite length transfer to progress as long as the bus arbiter continues to permit the master agent to retain control of the bus. In the preferred embodiment, one data word moves across the bus on every cycle that the master and slave can transmit and receive the data (allowing either agent to slow down the transfer if needed).

Most operations between agents on the bus are atomic operations (e.g., single read or write operations). Some operations are non-atomic operations because they involved more than one transaction. For example, in a read-modify-write operation, a master agent will read data from a slave agent, modify the data which was read, and then write the modified data back to the slave agent in the location from which the data was read. There will be an interval when the bus is unused while the master is modifying the data before writing it back. Data corruption can occur, if, during the interval that the first master is modifying the data, another master agent uses the bus to read or write data to the location on the slave where data will be written at the conclusion of the read-modify-write operation.

Many computer buses incorporate a lock semantic to allow a device to complete a non-atomic operation as if it were atomic. In most cases, a total bus lock is implemented. However, a total bus lock reduces the bus bandwidth available for other masters on the bus by not allowing any other accesses to occur while the lock is held.

Other implementations have an address based lock that increases the bandwidth available to other master agents on the bus by permitting the other masters to access addresses of non-locked agents during the intervals of non-atomic operations when the bus is free. In the address based lock schemes, central memory logic stores the locked addresses and issues back-down signals to any masters (except the locking master) that attempt to access locked addresses. In this way, other masters can access non-locked addresses while a master has locked the addresses of one or more slave agents. While the address lock scheme increases the bandwidth of the bus, the central memory logic increases the complexity and cost of the bus interface.

SUMMARY OF THE INVENTION

It is therefore an object of the present invention to allow the address decode in a Personal Computer to be distributed while still providing the functionality of routing all unclaimed accesses to the standard PC bus.

It is a further object of the present invention to allow bus master devices ("agents") to send/receive a burst of data to/from a slave without determining in advance the number of data words to be transferred, or even the maximum number of data words that could be transferred.

It is a further object of the present invention to allow either the master, the slave, or the bus arbiter to terminate the burst at any time with minimum overhead.

It is a further object of the present invention to permit either the master or the slave to throttle the speed of the data transfer by adding wait states.

It is also an object of the present invention to allow a simple implementation of a bus locking protocol that supports the lock semantics of the prior art while allowing other master agents to make unrelated accesses to unlocked devices over the bus during the time that the bus is locked.

The present invention provides a method for performing distributed address decode on a peripheral component bus which couples a plurality of agents to one or more processors. In the present invention, one of the agents coupled to the peripheral component bus is a bridge which couples standard PC bus agents to the peripheral component bus through a standard PC bus. In the present invention, a signal line DEVSEL# is defined which is coupled to all devices on the peripheral component bus. Whenever a slave device ("agent") decodes an address that is allocated to the predefined address space of the slave agent, the slave asserts the signal DEVSEL#. The addressed slave agent responds to an address within N clock periods. The master waits at least N+2 clock periods before aborting the transaction due to no response from an addressed slave agent. One device per bus, (called the subtractive decode device) senses the DEVSEL# line and, if DEVSEL# is not asserted within N clock cycles, the subtractive decode device then asserts DEVSEL# and becomes the target agent of the transaction regardless of the address. In the preferred embodiment of the system, the subtractive decode device would normally be the bridge to the standard PC bus. This allows any unclaimed transaction to be routed to the standard bus without impacting the design complexity of the devices in the system and without requiring a centralized decoder.

Furthermore, in the present invention, a master is granted the bus whenever his GNT# signal is active, FRAME# is inactive and IRDY# is inactive on the same active clock edge. Once a master agent is granted the bus, he may initiate the bus transaction by driving the address onto the AD lines, the bus command onto the C/BE# lines and asserting the FRAME# signal. There is only one explicit address given for each transaction and the AD lines will carry data during the rest of this bus transaction. The bus transaction continues until both the FRAME# and IRDY# signals (both driven by the master) are inactive at the same active clock edge. At all times during the transaction, whenever IRDY# (driven by the master) and TRDY# (driven by the slave) are both active on a given active clock edge, the data on the AD lines on that active clock edge are transferred. The implied address for each data word is incremented for each data word transferred.

The master may decide at any time to end the transaction. The master does this by driving FRAME# inactive and IRDY# active until the master samples either TRDY# or STOP# active whereby the master responds by maintaining FRAME# inactive and driving IRDY# inactive for one clock period to signify the end of the bus transaction.

The slave may request that the master end the transaction by asserting STOP# and holding it asserted until it sees FRAME# deasserted at an active clock edge. The slave must then deassert the STOP# signal. When the master samples STOP# asserted at an active clock edge, it must terminate the transaction as described above.

The arbiter may request that the master end the transaction and give up control of the bus by deasserting the master's GNT# signal. When the master sees GNT# deasserted at an active clock edge, it must terminate the bus transaction (after it has controlled the bus for at least a minimum predetermined time) as described above.

Finally, in the bus lock of the present invention, each bus slave agent is required to be able to enter a locked state, and, once in the locked state, to reject all accesses to it except those initiated by the master agent that locked it. Signal line LOCK# is owned by only one master agent at a time. The LOCK# signal must be obtained by acquiring the bus while LOCK# is high. Ownership of LOCK# is maintained by the locking master as long as LOCK# is held low. The ownership of LOCK# continues even while another master owns the bus. By following the protocol for the use of the LOCK# signal, a bus master can order a slave device to reject an access from any other master agent. On subsequent accesses by the same master agent, the locking master informs the locked device that it may respond by driving LOCK# inactive during the first clock cycle of the access. Although the signalling protocol could allow it, if software has no knowledge of the particular locking scheme used, a master agent may only lock one device during a single locked operation and may not access any other devices while it owns the LOCK# line. This is to avoid deadlock conditions. If software can guarantee that no deadlock conditions can occur, then multiple devices may be locked and the owner of LOCK# may access other agents without locking them. As long as a device is locked, all accesses by any master agents except the owner of LOCK# will be rejected. The locking master unlocks locked devices by driving LOCK# and FRAME# high. Any master, including the previous locking master, can then acquire the LOCK# signal to make locked accesses. A locked device is unlocked when FRAME# and LOCK# are both deasserted on the same clock. Otherwise, the devices remain locked.

BRIEF DESCRIPTION OF THE DRAWINGS

The objects, features and advantages of the present invention will be apparent from the following detailed description of the preferred embodiment in which:

FIG. 5 illustrates a master initiated termination;

FIG. 6 illustrates a master initiated termination with a one clock delay;

FIG. 7 illustrates a master initiated abort termination;

DETAILED DESCRIPTION OF THE INVENTION

The present invention comprises a multiple-master computer data bus with decentralized decoding that allows a master agent to lock and access one or more resources on the bus. Other master agents may use the bus to access resources that have not been locked. However, access by other masters to a locked resource are denied until the locking master agent releases the resource. The data bus also allows a variable length data transfer to take place between agents coupled to the bus. The data transfer continues as long as the bus arbiter permits the master to maintain control of the bus. One data word moves across the bus on every bus cycle, such that the master and slave can send/receive the data, thereby allowing either agent to slow down the transfer if necessary. While the invention has been described in conjunction with the preferred embodiment, it will be evident that numerous alternative modifications, variations and uses will be apparent to those skilled in the art in light of the following description.

Figure 1:
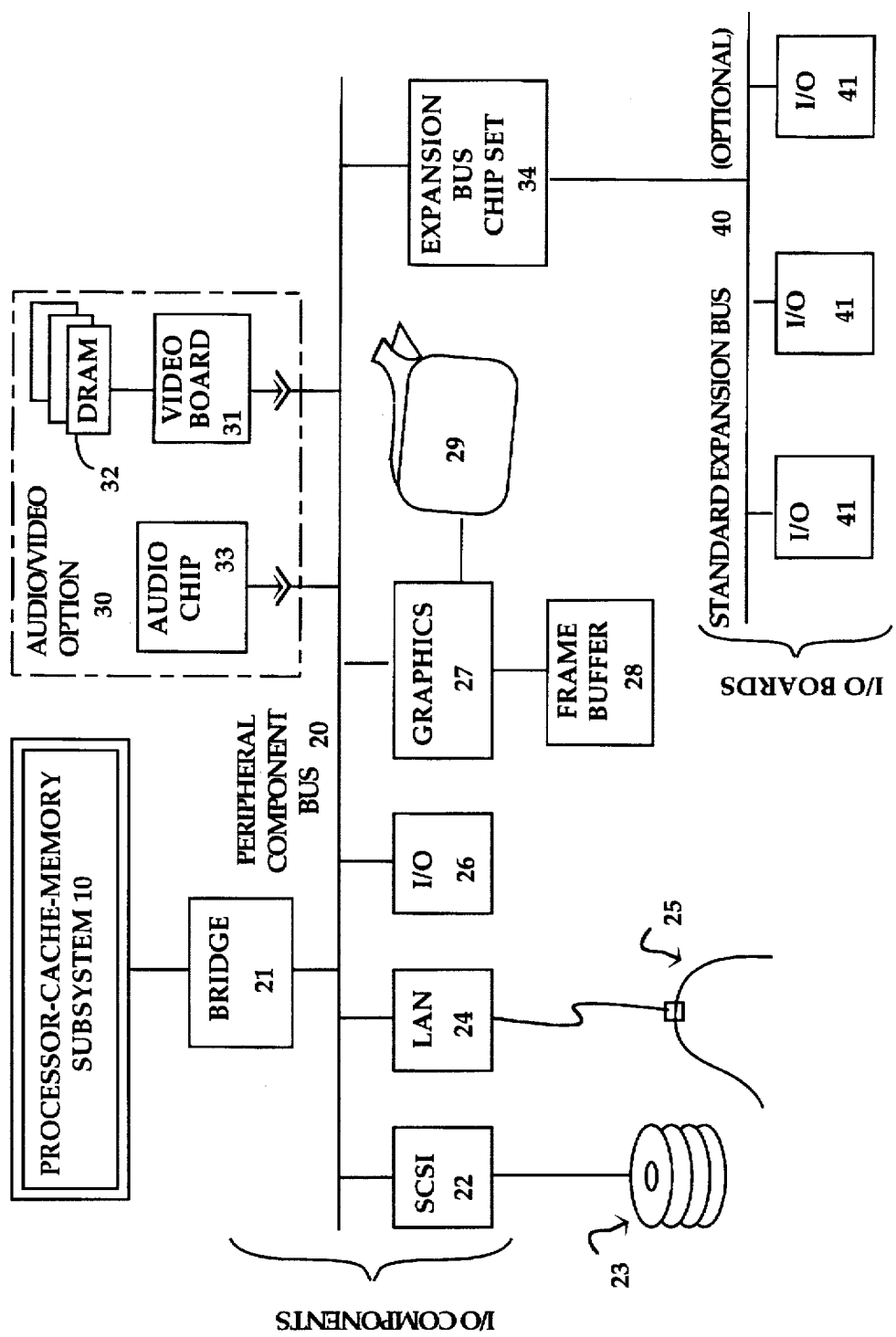
FIG. 1 illustrates a computer system incorporating the preferred embodiment of the present invention.

The preferred embodiment of the present invention is depicted in FIG. 1. A processor-cache-memory subsystem 10 is coupled to a peripheral component bus 20 through a bridge 21. The bridge 21 provides a low latency path through which the processor of the processor-cache-memory subsystem 10 may directly access peripheral component devices mapped anywhere in the memory or input/output (I/O) address spaces. The bridge 21 also provides a high bandwidth path allowing peripheral component masters direct access to main memory of the processor-cache-memory subsystem 10. In addition, the bridge 21 may optionally include such functions as address translation for processors that have a larger address space than the peripheral component bus as well as other central functions of the peripheral component bus (e.g., arbitration).

Peripheral components commonly found in computer configurations are coupled to the peripheral component bus 20. In the depicted embodiment of the present invention, a mass storage device interface such as Small Computer System Interface (SCSI) 22 couples the mass storage device disk drive 23 to the peripheral component bus 20. A local area network (LAN) interface 24 couples the LAN cable 25 to the peripheral component bus 20. In addition, a graphics board 27 is coupled to the peripheral component bus 20, to display device 29 and also to frame buffer 28. An I/O device 26 is also coupled to the peripheral component bus 20.

The peripheral component bus 20 of the present invention can optionally support system expansion capability. These after-market expansion connectors are represented in the block diagram with an audio/video option 30. In the depicted audio/video option 30, audio chip 33 is coupled to the peripheral component bus 20. Video board 31 is also coupled to the peripheral component bus 20, as well as to dynamic random access memory (DRAM) 32. However, in the preferred embodiment of the present invention, many after-market expansion cards will remain on a standard I/O expansion bus 40 (e.g., ISA, EISA, Micro Channel). In this configuration, one component (or set of components) the expansion bus chip set 34 on the peripheral component bus 20, generates the standard I/O expansion bus protocols 40 used in the system. I/O devices 41 which conform to the standard protocol of the I/O expansion bus 40 are coupled to the bus 40. The primary task of the expansion bus chip set 34 is to function as a bridge and thereby couple the two computer buses (i.e., Peripheral component bus 20 and I/O expansion bus 40) and provide a way for requests that originate on one bus to have a destination on the other. This requires the expansion bus chip set 34 to accept a request on one bus and initiate the appropriate bus operation on the other bus. The expansion bus chip set 34 has the ability to be both master agent and slave agent on both buses. When the expansion bus chip set 34 is a slave agent on one bus it is also a master agent on the other. In some laptop and other systems, an I/O expansion bus would not be required.

The basic bus transfer mechanism on the peripheral component bus 20 is a burst transfer. A burst is comprised of an address phase and one or more data phases. By default, the address is assumed to increment linearly as each data phase completes.

Figure 2:
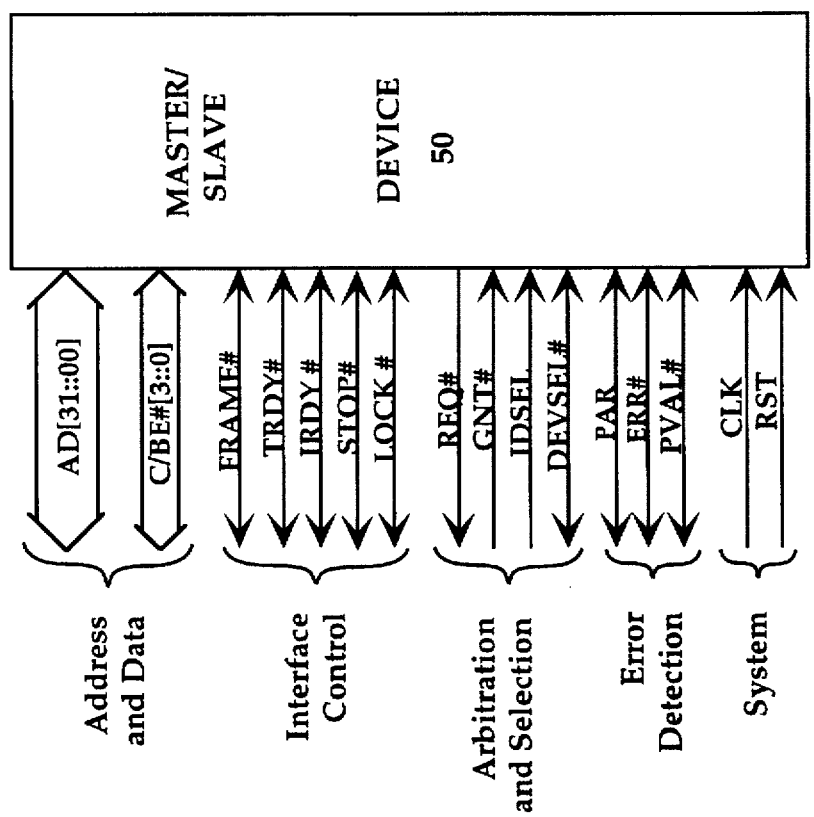
FIG. 2 illustrates bus signal lines for a master/slave device.

FIG. 2 illustrates the address, data and control signals of a generic peripheral component device 50 of the preferred embodiment of the present invention. The direction indication on signals in FIG. 2 assume that the device is a master/slave combination device.

Figure 3:
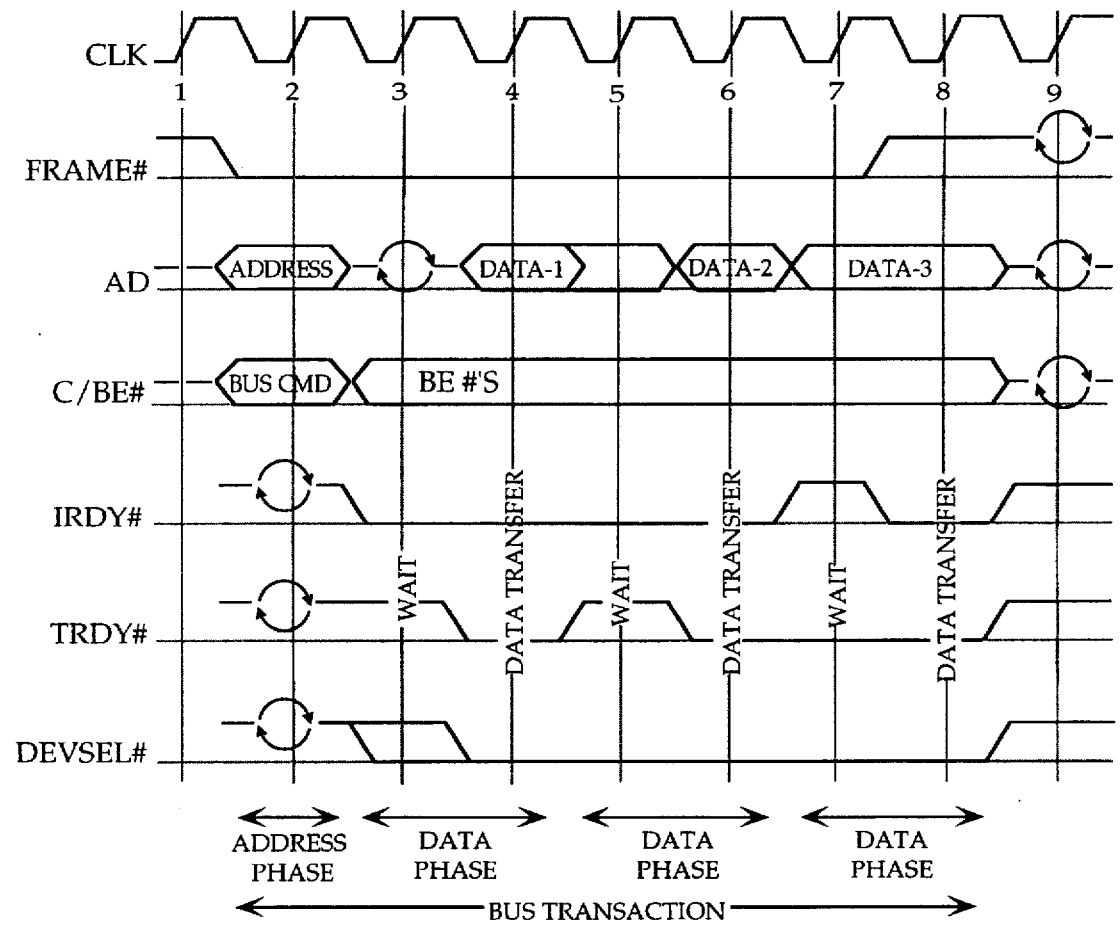
FIG. 3 illustrates a basic read operation.

The fundamentals of all peripheral component bus data transfers are controlled with three signals. Timing diagrams such as that shown in FIG. 3 illustrate the relationship of the significant signals involved. A signal drawn as a solid line in the figure, is actively being driven by the current master or slave target agent. A signal drawn as a dashed line indicates that, no agent is actively driving it, however, it may still be assumed to contain a stable value if the dashed line is high. Tri-stated signals are indicated to have indeterminate values when the dashed line is between the high and low states (e.g., AD or C/BE# lines). In addition, in the figures, when a solid line becomes a dotted line, it indicates the signal was actively driven and now is tri-stated. When a solid line makes a low to high transition, and then becomes a dotted line, it indicates the signal was actively driven high to precharge the bus, and then tri-stated. This convention is followed for all of the timing diagrams illustrated in the figures.

In the preferred embodiment of the present invention, all signals are sampled on the rising edge of the clock. Each signal has a setup and hold aperture with respect to the rising clock edge, in which transitions are not allowed. Outside this aperture signal, values or transitions have no significance. Hereinafter, the terms "edge" and "clock edge" will always refer to the rising edge of the clock.

Referring again to FIG. 2, the three fundamental control signals for data transfer on the peripheral component bus of the present invention are: FRAME#, IRDY# and TRDY#. A # symbol at the end of a signal name indicates that the active state occurs when the signal is at low voltage. When the # symbol is absent, the signal is active at a high voltage. The signal FRAME# is driven by the master to indicate the beginning and end of a transaction. The signal IRDY# is also driven by the master and allows the master to force wait cycles during a data transfer. The signal TRDY# is driven by the target and allows the target to force wait cycles.

More specifically, the control signal FRAME# (Cycle Frame) is driven by the current master to indicate the beginning and duration of an access. FRAME# is asserted to indicate a bus transaction is beginning. While FRAME# is asserted, data transfers continue. When FRAME# is deasserted, the transaction is in the final data phase.

The control signal TRDY# (Target Ready) indicates the target agent's (selected device's) ability to complete the current data phase of the transaction. TRDY# is used in conjunction with IRDY#. A data phase is completed on any clock both TRDY# and IRDY# are sampled asserted. During a read, TRDY# indicates that valid data is present on the multiplexed address/data peripheral component bus 20 AD lines. During a write, TRDY# indicates the target agent is prepared to accept data. Wait cycles are inserted until both IRDY# and TRDY# are asserted together.

The control signal IRDY# (Initiator Ready) indicates the initiating agent's (bus master's) ability to complete the current data phase of the transaction. IRDY# is used in conjunction with TRDY#. A data phase is completed on any clock both IRDY# and TRDY# are sampled asserted. During a write, IRDY# indicates that valid data is present on the multiplexed address/data bus. During a read, it indicates the master is prepared to accept data. Wait cycles are inserted until both IRDY# and TRDY# are asserted together.

The other signal lines of a basic read operation of FIG. 3 are CLK, AD, and C/BE#. The timing signal CLK (Clock) provides timing for all transactions on the peripheral component bus 20 and is an input to every device coupled to the bus 20. All other peripheral component bus signals are sampled on the rising edge of CLK, and all other timing parameters are defined with respect to this edge. In the preferred embodiment, the peripheral component bus may operate over a wide range of frequencies.

Address and Data are multiplexed on the same peripheral component bus lines, AD (preferably 32 bits wide). During the first clock of a transaction AD(31::00) lines contain a physical byte address (32 bits). During subsequent clocks, AD(31::00) lines contain data. A bus transaction consists of an address phase followed by one or more data phases. The peripheral component bus supports both read and write bursts. In the preferred embodiment, little-endian byte ordering is used. AD(07::00) lines define the least significant byte and AD(31::24) lines the most significant byte.

Bus Command and Byte Enables are multiplexed on the same peripheral component bus lines C/BE#(3::0). During the address phase of a transaction, C/BE#(3::0) define the bus command. Bus commands indicate to the target the type of transaction the master is requesting. During the dam phase C/BE#(3::0) are used as Byte Enables. The Byte Enables determine which byte lanes carry meaningful data. C/BE#(0) applies to byte 0 (i.e. AD (7::0)), and C/BE#(3) to byte lane 3 (i.e. AD (31::24)). In the present invention, a bus command of 0010 indicates an I/O read and is used to read data from an agent mapped in I/O address space. A bus command of 0011 indicates an I/O write and is used to write data to an agent mapped in I/O address space. A bus command of 0110 indicates an memory read and is used to read data from an agent mapped in memory address space. A bus command of 0111 indicates a memory write and is used to write data to an agent mapped in memory address space. A detailed description of other bus commands appears in co-pending U.S. patent application Ser. No. 869,490, entitled "Improved Bus with Commands for optimizing the Management of Bus Bridge Buffering" which was filed on Apr. 15, 1992 and is hereby incorporated fully by reference.

The control line DEVSEL# (Device Select), when actively driven, indicates the driving device has decoded its address as the target of the current access. As an input, it indicates whether any device on the peripheral component bus has been selected.

The signal LOCK# (Lock) indicates an atomic operation that may require multiple transactions to complete. While LOCK# is asserted, non-exclusive transactions may proceed. A grant to start a transaction on the peripheral component bus does not guarantee control of LOCK#. Control of LOCK# is obtained under its own protocol in conjunction with GNT#. It is possible for different agents to use the peripheral component bus while a single master retains ownership of LOCK#. The signal LOCK# is central to the operation of the present invention, therefore a detailed description of LOCK# appears below in connection with FIGS. 12–14.

The signals GNT# and STOP# also affect the function of the present invention. The signal STOP# (Stop) indicates that the current target is requesting the master to stop the current transaction. The signal GNT# (Grant) indicates to a master that access to the bus has been granted. GNT# is a point to point signal. Every master has its own GNT#.

FIG. 2 also illustrates signals REQ#, IDSEL, PVAL and RST and these signals will be discussed briefly for completeness.

The signal REQ# (Request) indicates to the arbiter that this agent desires use of the bus. This is a point to point signal. Every master has its own REQ#.

The signal IDSEL (Initialization Device Select) is used as a chip select in lieu of the upper 16 address lines (AD (31::16)) during configuration read and write transactions. A detailed description of IDSEL# appears in co-pending U.S. patent application Ser. No. 859,816, entitled "Configuration Space Enable/Disable Mechanics" which was filed on Mar. 30, 1992 and is hereby incorporated fully by reference.

In the preferred embodiment of the present invention, the error detection function is optional for peripheral component bus agents. Those agents providing error detection are required to provide PAR, ERR# and PVAL#. Those agents not providing error detection are required only to provide PVAL#. The signal PAR (Parity) is the even parity bit that protects the AD(31::00) lines. The signal PVAL# (Parity Valid) is driven by the agent that generates parity, indicating the agent's ability to do so. If the agent driving AD does not implement parity, the agent must nonetheless actively drive this signal to the parity not valid state on any cycle in which the agent drives AD. The signal ERR# (Error) may be pulsed active by an agent that detects a parity error. More generally, ERR# can be used by any agent to signal serious hardware errors or data corruptions. Preferably, upon detection of an ERR# pulse, the central resource generates a nonmaskable (or high priority maskable) interrupt to the host CPU, which often implies the system will be unable to continue operation once error processing is complete. Pulsing ERR# is a "last recourse" for "hard" errors. Non-catastrophic or correctable errors (e.g., corrected single bit memory errors in error detection and correction (EDAC) systems, power failures in uninterruptible power supply (UPS) systems, etc.) should be signaled with other means.

The signal RST (Reset) forces the peripheral component bus sequencer of each device to a known state. The arbiter negates all GNT#s and all masters negate their requests. (The agent in which the arbiter is embedded will typically enable its AD, C/BE#, and PVAL# output buffers during reset to keep them from floating.)

A Bus Transaction may be started by a master agent by driving FRAME# active when it samples FRAME# and IRDY# inactive and its GNT# active on the same clock. The first clock edge on which FRAME# is sampled asserted is the address phase, and the address and bus command code are transferred on that clock edge. The next clock edge begins the first of one or more data phases, during which data is transferred between master and slave on each clock edge for which both IRDY# and TRDY# are sampled asserted. Wait cycles may be inserted by either the master or the target with the IRDY# and TRDY# signals respectively. At such time as the master intends to complete only one more data transfer (which could be immediately after the address phase), it deasserts FRAME#. IRDY# must also be asserted at this time, indicating the master is ready for the final data transfer. After the target indicates the final data transfer (TRDY# asserted), the master deasserts IRDY#, causing the interface to return to the idle state (FRAME# and IRDY# deasserted) on the next clock edge.

In the preferred embodiment, all peripheral component bus addressing is done on byte boundaries and all 32 AD lines are decoded for memory and I/O cycles. Address bits AD1 and AD0 are used only for address decode and encode the least significant valid byte. Each agent is responsible for its own positive address decode. Only one agent (preferably the expansion bus) on the peripheral component bus may do subtractive decode. A detailed description of distributed address decode appears below in relation to FIGS. 7–8.

There is no byte lane swapping on the peripheral component bus, since all peripheral component bus compliant devices must connect to all 32 address/data bits for address decode purposes. This means that bytes will always appear in the correct lanes as indicted by the address.

Furthermore, the preferred embodiment of the peripheral component bus need not support automatic bus sizing (e.g., BS8# and BS16# signals on an Intel 80386 microprocessor). In general, software takes into account the characteristics of the target agent, and only issues appropriate length accesses; memory is one particular exception. Since the peripheral component bus is not a primary memory bus, and since performance sensitive local memory will be 32 bits wide anyway, BIOS is the only real bus sizing concern. In the preferred embodiment, the memory bus is given a 32-bit peripheral component bus interface, independent of the width of the memory.

The byte enables alone are used to determine which bytes carry meaningful data. The byte enables are free to change between data phases but in the preferred embodiment must be valid on the edge of the clock that starts each data phase and must stay valid for the entire data phase. In the diagram of FIG. 3, data phases begin on clocks 2, 4 and 6. (Changing byte enables during a read burst transaction is generally not useful, but is supported on the bus.) The master is free to change the byte enables on each new data phase, (although the read diagram does not show this). If the master changes byte enables on a read transaction it does so with the same timing as write. If byte enables are important for the target agent on a read transaction, the target agent must wait for the byte enables to be driven on each data phase before completing the transfer.

The present invention allows any contiguous or non-contiguous combination of byte enables. However, some targets may not be able to properly interpret non-contiguous patterns, (e.g., expansion bus bridges that interface to 8 and 16-bit slaves). If this occurs, a target can report an illegal pattern as an error and the master would then use a contiguous pattern.

A turn-around-cycle is required on all signals that may be driven by more than one agent. The turn-around-cycle is required to avoid contention when one agent stops driving a signal and another agent begins, and must last at least one clock. This is indicated on the diagrams as two arrows pointing at each others' tail. This turn-around-cycle occurs at different times for different signals. For instance IRDY#, TRDY# and DEVSEL# use the address phase as their turn-around-cycle. While FRAME#, C/BE# and AD use the idle cycle between transactions as their turn-around-cycle.

The cycle between clocks 8 and 9 is called an idle cycle. Idle cycles appear on the peripheral component bus between the end of one transaction and the beginning of the next. An idle cycle is indicated by FRAME# and IRDY# both deasserted.

Address decoding on the preferred peripheral component bus is distributed; i.e., performed on every device. This obviates the need for central decode logic, or for device select signals beyond the one used for configuration. The peripheral bus supports two styles of address decoding: positive and subtractive. Positive decoding is faster since each device is looking for accesses in the address range(s) that it has been assigned. Subtractive decoding can be implemented by only one device on the bus, since it accepts all accesses not positively decoded by some other agent. This decode mechanism is slower since it must give all other bus agents a "first right of refusal" on the access. However, it is very useful for an agent like a standard expansion bus that must respond to a highly fragmented address space.

In the preferred embodiment, all 32 AD lines must be driven to stable values during every address and data phase. Even byte lanes not involved in the current data transfer must physically drive stable (albeit meaningless) data onto the bus. The motivation is to keep input buffers on byte lanes not involved in the transfer from switching at the threshold level while wait cycles are inserted, and more generally, to facilitate fast metastability free latching.

Referring again to FIG. 3, a read transaction is illustrated. The transaction starts on clock 1 when the master asserts FRAME#. The first time any other agent is aware a transaction has started is clock 2 when FRAME# is sampled asserted for the first time. The clock in which FRAME# is first asserted is called the address phase. During the address phase AD(31::00) lines contain a valid byte address and C/BE#(3::0) lines contain a valid bus command.

The clock following the address phase is the first clock of the first data phase. During the data phase, the C/BE# signals indicate which byte lanes are involved in the current data phase. The C/BE# lines are driven valid by the master on the clock edge between the address and data phase. A data phase may have wait cycles. Once enabled, the output buffers must stay enabled through the end of the transaction. (This insures the C/BE# lines are not left floating for long intervals.)

The first data phase on a read transaction requires a turn-around-cycle (enforced by the target via TRDY#). In this case, the master drove the address and then stopped driving the AD lines on clock 2. The target of the transaction can not drive the AD lines any sooner than clock 3. The target must enable its output buffers as soon as possible after clock 3 when DEVSEL# is asserted even though it may stretch the data phase by detaining TRDY#. Once enabled, the output buffers must stay enabled through the end of the transaction. (This insures AD are not left floating for long intervals.)

A data phase completes when data is transferred, which occurs when both IRDY# and TRDY# are asserted on the same clock edge. When either is deasserted, a wait cycle is inserted and no data is transferred. As noted in the diagram, data is successfully transferred on clocks 4, 6, and 8, and wait cycles are inserted on clocks 3, 5 and 7. The first data phase completes in the minimum time for the first data phase of a read transaction. The second data phase is extended because the target deasserted TRDY#. The last data phase is extended because the master deasserted IRDY#.

The master detects at clock 6 that the next data phase is the last. However, because the master is not ready to complete the last transfer (IRDY# deasserted from clock 6), FRAME# stays asserted. Only when IRDY# will be sampled asserted can FRAME# be deasserted, which occurs on clock 7.

Figure 4:
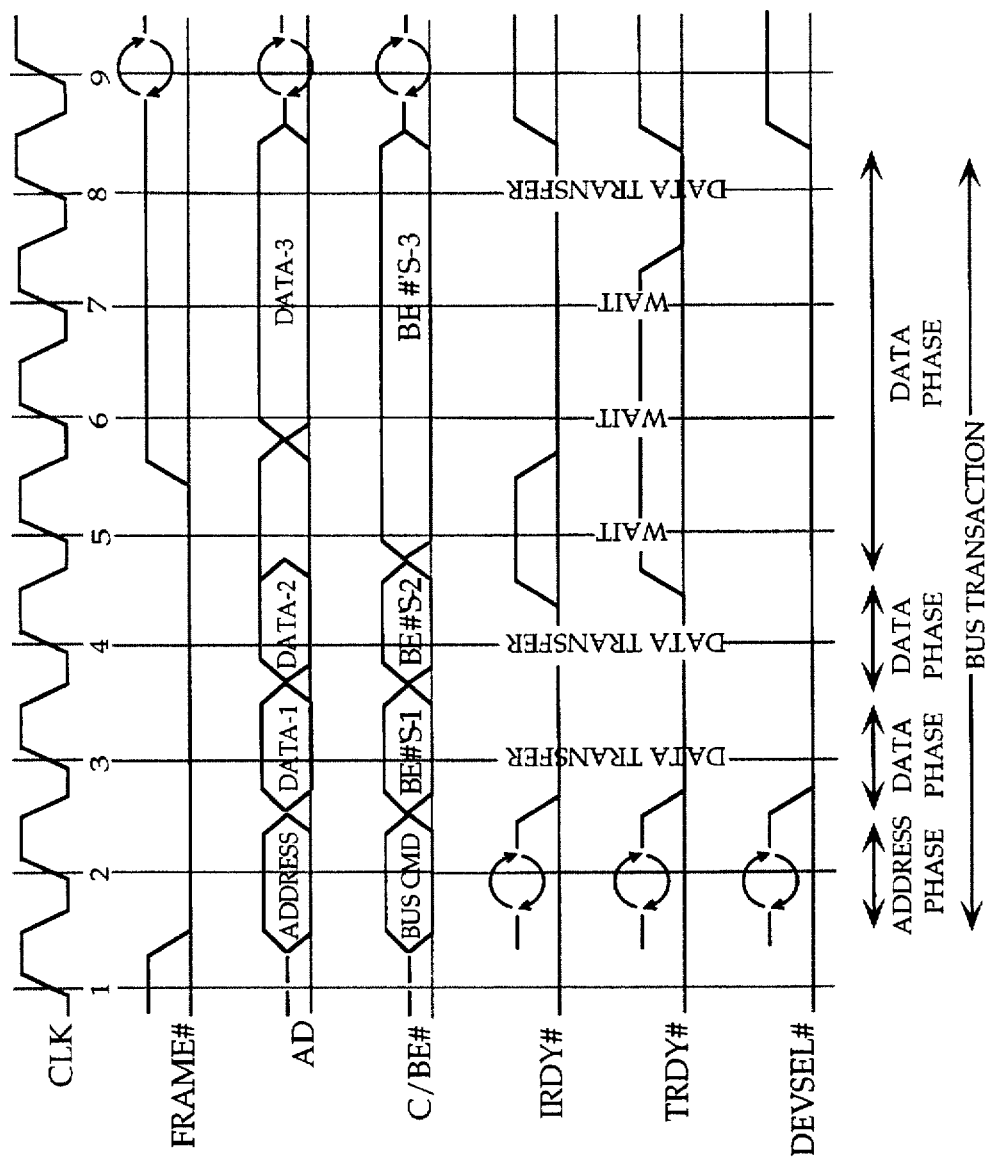
FIG. 4 illustrates a basic write operation.

FIG. 4 illustrates a write transaction. The transaction begins on clock 1 when the master asserts FRAME#. The write is similar to the read, except no turn-around-cycle is required during the first data phase, because the master provides both address and data. Beyond this difference, data phases for writes work the same as for reads.

In FIG. 4, the first and second data phases complete with zero wait cycles. However, the third data phase has three wait cycles inserted by the target. Notice both agents insert a wait cycle on clock 5. IRDY# must be asserted before or with the deassertion of FRAME#. Note also that the master delayed a data transfer on clock 5 by negating IRDY# on clock 4. The last data phase is signaled by the master on clock 6, but does not complete until clock 8.

Termination of a peripheral component bus transaction may be initiated by either the master or the target slave. While neither can actually stop the transaction unilaterally, the master remains in ultimate control, bringing all transactions to an orderly and systematic conclusion regardless of what caused the termination. All transactions are concluded when FRAME# and IRDY# are both sampled deasserted, indicating an idle cycle (e.g., clock 9 in FIG. 4).

The mechanism used in master initiated termination is deassertion of FRAME# coincident with IRDY# assertion. This signals the target that the final data phase is in progress. The target signals the final data transfer with TRDY#, whereupon the master deasserts IRDY# (indicating bus idle) and the transaction is ended.

The master may initiate termination using this mechanism for one of two reasons:

"Completion": refers to termination when the master is concluded with its intended transaction. This is the most common reason for termination.

"Timeout": refers to termination when the master's GNT# line is deasserted and its internal latency timer has expired. The signal line GNT# (Grant) indicates to the agent that access to the bus has been granted. This is a point to point signal. Every master has its own GNT#. When a timeout occurs, the intended transaction is not necessarily concluded. The timer may have expired because of target induced access latency, or because the intended operation was very long.

Bus acquisition latency is a measurement of how long it takes to acquire the resources needed to run a cycle, and consists primarily of how many masters can be queued ahead of the agent (driven by the number of masters, arbitration algorithm, and requester priority), and how much time each can spend on the bus. Slave latency can be fixed (e.g., access to an I/C port), or variable (e.g., a frame buffer where some percent of cycles collide with a screen refresh). Accurate latency prediction is significantly more complex when slaves can force a master to retry transactions as in the present invention. This is because a master may have to rearbitrate for the bus (perhaps multiple times) before its access can be satisfied. A peripheral component master can burst indefinitely so long as the target agent can source/sink the data, and no other agent requests the bus. However, in the preferred embodiment of the present invention, two mechanisms cap a master's tenure in the presence of other requests, so that predictable bus acquisition latency can be achieved. These are defined as follows:

"Master latency timer" (LT): Each master's LT is cleared and suspended whenever it is not asserting FRAME#. When a master asserts FRAME# it enables its LT to count. If the master deasserts FRAME# prior to count expiration, LT is meaningless. Otherwise, once the count expires (count="T" clocks), the master must initiate transaction termination as soon as its GNT# is removed. In essence "T" represents a minimum guaranteed time slice (measured in clocks) allotted to the master, after which it must surrender tenure as soon as its GNT# is removed. (Actual termination does not occur until the target is ready.)

"Target initiated Termination" (Specifically Disconnect): A target must manipulate TRDY# and STOP# so as to end the transaction upon consummation of the data phase "N" (where N=1,2,3, . . . ), if the incremental latency to data phase "N+1" is greater than a predetermined number of clocks (preferably 8 clocks). For example, assume that a peripheral component bus master read from an expansion bus takes a minimum of 15 clocks. Applying the rule for N=1, the latency to data phase 2 is 15 clocks, thus the target must terminate upon completion of the data phase 1 (i.e., a target agent this slow must break attempted bursts on data phase boundaries.)

Note that neither mechanism restricts latency to the first data phase. If the assumption is made that in a particular system there is no slave so slow that it delays TRDY# to the first data by more than "T" clocks, then it can be shown that the longest transaction that the master will execute is T+8 clocks (assuming its GNT# is removed before its LT expires). Assuming T=40 and a 25 Mhz bus, the maximum transaction is 1.92 microseconds.

In effect "T" represents a trade-off between throughput (relatively high values) and latency (low values). For example, T=40 accommodates a burst of 32 data phases if both master and target are capable of 0 wait cycle bursts (assuming 8 clock latency to first data). Reducing T to 20 would likely break bursts every 12 to 14 data phases, but would constrain the maximum transaction to 1.12 microseconds.

A modified version of this termination mechanism allows the master to terminate the transaction when no target responds. This abnormal termination is referred to as Master-abort. Although it may cause a fatal error of the application originally requesting the transaction, the transaction completes gracefully, thus preserving normal peripheral component bus operation for other agents.

Two examples of completion are shown in FIGS. 5 and 6. In FIG. 5 IRDY# is already asserted when the master deasserts FRAME#. In FIG. 6 the master deasserts FRAME# coincident with IRDY# assertion. TRDY# active indicates the final data transfer (clock 3) in both figures. IRDY# is then deasserted, indicating bus idle (clock 4), and end of the transaction. The target agent deasserts TRDY# after clock 3 since that was the final data transfer. Note that the target was not required to respond on clock 3; it may delay the final data transfer (and transaction termination) until it is ready, by delaying the final assertion of TRDY#. If the target does that, the master is required to hold IRDY# asserted until the final data transfer occurs.

Both FIGS. 5 and 6 could also be examples of timeout termination. In FIG. 5, the master deasserts FRAME# immediately upon timer expiration (clock 2) because IRDY# is already asserted, and GNT# is deasserted, not allowing continued use of the bus beyond timer expiration. Termination then proceeds as normal. The example of FIG. 6 shows a one clock delay in FRAME# deassertion because the master was not capable of asserting IRDY# when timeout occurred. Note that the master must be driving valid data (write) or capable of receiving data (read) whenever IRDY# is asserted. This delay in termination should not be extended more than 2 or 3 cycles. Also note that the transaction need not be terminated after timer expiration unless GNT# is deasserted.

In the present invention, DEVSEL# is driven by the target of the current transaction as shown in FIG. 7. Preferably, DEVSEL# may be driven one, two or three clocks following the address phase. DEVSEL# must be asserted with or prior to the edge at which the target provides data on the AD line during a read operation or be asserted with or prior to the edge at which the target enables its TRDY# or STOP#. In other words, a target must assert DEVSEL# (claim the transaction) before it is allowed to issue any other slave response. In all cases except one, once a target asserts DEVSEL# it will not deassert DEVSEL# until the same edge the master uses to deassert the final IRDY#. The exception is the target abort.

Figure 8:
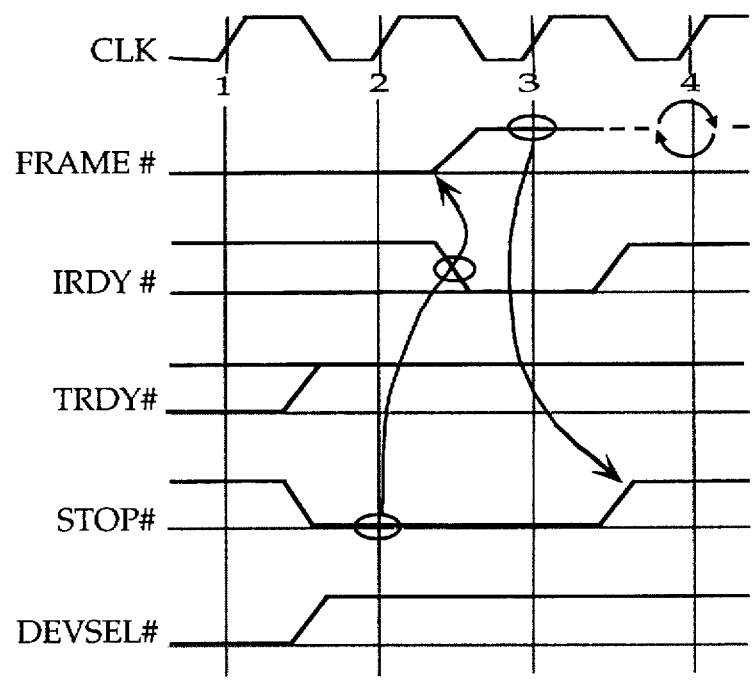
FIG. 8 illustrates a target initiated abort termination.

FIG. 8 shows target-abort, which is signalled by asserting STOP# coincidentally with the deassertion of DEVSEL#. This indicates the target needs the transaction to be terminated and does NOT want the transaction tried again. Additionally, if any data has already been transferred in the current transaction, it may have been corrupted. An example of when target-abort would occur is when a master attempts to write to an address outside of the address space of the target. This would occur if the beginning address of the data burst being written to the target was within the address space of the target, causing the target to assert DEVSEL# and claim the transaction, but the data burst was so long that the address space of the target was exceeded. Preferably, the target would signal target-abort and refuse to accept the first (or subsequent) datum that exceeds the address space of the target. In the preferred embodiment of the present invention, the target must have asserted DEVSEL# for one or more clocks before a target-abort is signalled.

If no agent asserts DEVSEL# within a predetermined number of clocks (preferably three clocks) of FRAME# assertion by the master, an expansion bus bridge (the agent performing subtractive decode) may claim the request by asserting DEVSEL#. The expansion bus bridge then propagates the request to the expansion bus 40. If the system does not have a subtractive decode agent, or the subtractive decode agent has failed, then the master never sees DEVSEL# asserted and terminates the transaction per the master-abort mechanism depicted in FIG. 7.

Master-abort termination, as shown in FIG. 7, is an abnormal case of master initiated termination. In the preferred embodiment of the present invention, a master is able to determine that there will be no response to a transaction if DEVSEL# remains unasserted on the fifth clock of FRAME# assertion. The master must assume that the target of the access is incapable of dealing with the requested transaction or that the address was bad. Once the master agent has detected the missing DEVSEL# (clock 6 in this example), the master must deassert FRAME# and then deassert IRDY# on the following CLK. Alternatively, IRDY# can be immediately deasserted if FRAME# is already deasserted, as it may be in the case of a transaction with a single data phase. The master agent will normally not retry this access. Note that if DEVSEL# had been sampled asserted on clocks 3, 4, 5 or 6 of this example, it would indicate the request had been acknowledged by an agent, and a master-abort would not be permissible.

In the preferred embodiment of the present invention, a target agent must perform a full decode before driving/ asserting DEVSEL#, or any other slave response signal. It is a property of synchronous communication that contention occurs when more than one agent responds simultaneously on the same signal line. Therefore, in the preferred embodiment of the present invention, an agent may not drive DEVSEL# prior to a complete decode, and then let the decode combinationally resolve on the bus.

Most, if not all, slave devices will be able to complete a decode and assert DEVSEL# within 1 or 2 clocks of FRAME# (fast and medium in FIG. 7). Accordingly, in the preferred embodiment of the present invention, the subtractive decode agent provides a configuration option to pull in by 1 or 2 clocks the edge at which the subtractive decode agent samples DEVSEL# thereby allowing faster access to the expansion bus. Use of such an option is limited by the slowest positive decode agent on the bus.

In summary, the following general rules govern FRAME# and IRDY# in all peripheral component bus transactions.

1. FRAME# and its corresponding IRDY# define the idle state of the bus; when either is asserted the bus is busy; when both are deasserted the bus is idle.

2. Once FRAME# has been deasserted, it cannot be reasserted during the same transaction.

3. FRAME# may only be deasserted when IRDY# is coincidentally asserted (or is already asserted). I.e., IRDY# must always be sampled asserted on the first clock edge that FRAME# is sampled deasserted.

The mechanism used in target initiated termination is the STOP# signal. The STOP# signal (Stop) indicates the current target is requesting the master to stop the current transaction. The target asserts STOP# to request that the master terminate the transaction. Once asserted, STOP# remains asserted until FRAME# is deasserted. The relationship between the IRDY# and TRDY# signals is independent of the relationship between STOP# and FRAME#. That is, data may, or may not, be transferred during the target's request for termination; this depends solely on the state of IRDY# and TRDY#. However, when STOP# is asserted with TRDY# deasserted, it indicates the target will not transfer any more data, and the master therefore does not wait for a final data transfer as it would in a completion termination.

The target may initiate termination using this mechanism for one of two reasons:

"Disconnect" refers to termination requested because the target is unable to respond within the latency guidelines of the peripheral component bus as detailed previously. Note that this is not usually done on the first data phase.

"Retry" refers to termination requested because the target is currently in a state which makes it unable to process the transaction. This may include the possibility of deadlock, some non-peripheral component bus resource busy condition, or an exclusive access locked condition.

A modified version of the preferred embodiment of this mechanism allows the target to terminate a transaction in which a fatal error has occurred, or to which the target will never be able to respond. This abnormal termination is referred to as target-abort which was discussed previously in connection with FIG. 8. Although target-abort may cause a fatal error for the application originally requesting the transaction, the transaction completes gracefully, thus preserving normal peripheral component bus operation for other agents.

Preferably, most target agents will be required to implement at least retry capability, but any other versions of target initiated termination are optional for targets. Master agents must be capable of properly dealing with them all. Retry is also optional to very simple targets that (1) do not support exclusive (locked) accesses, (2) cannot detect possible deadlock or livelock conditions, and (3) cannot get into a state where they may need to reject an access.

Figure 9:
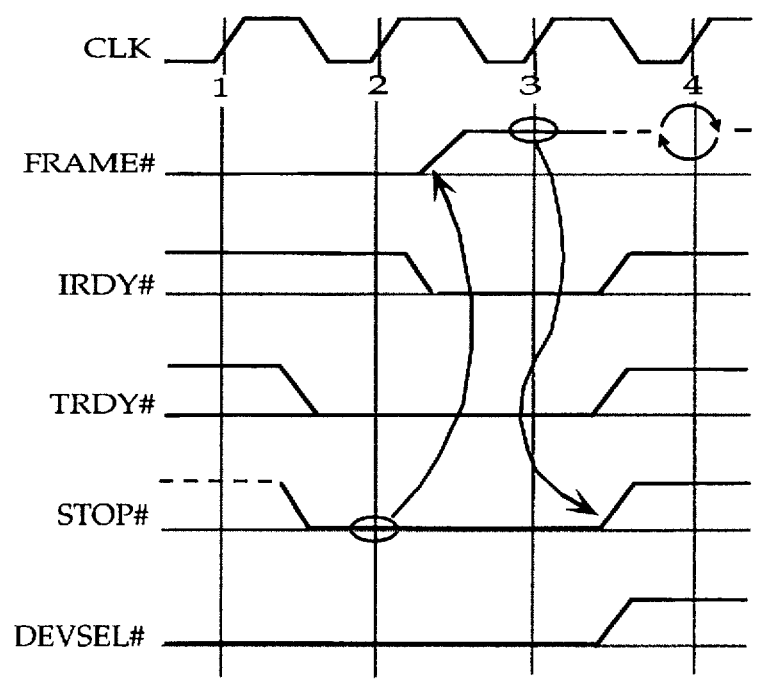
FIG. 9 illustrates a target initiated termination with data transferred after FRAME# is deasserted.
Figure 10:
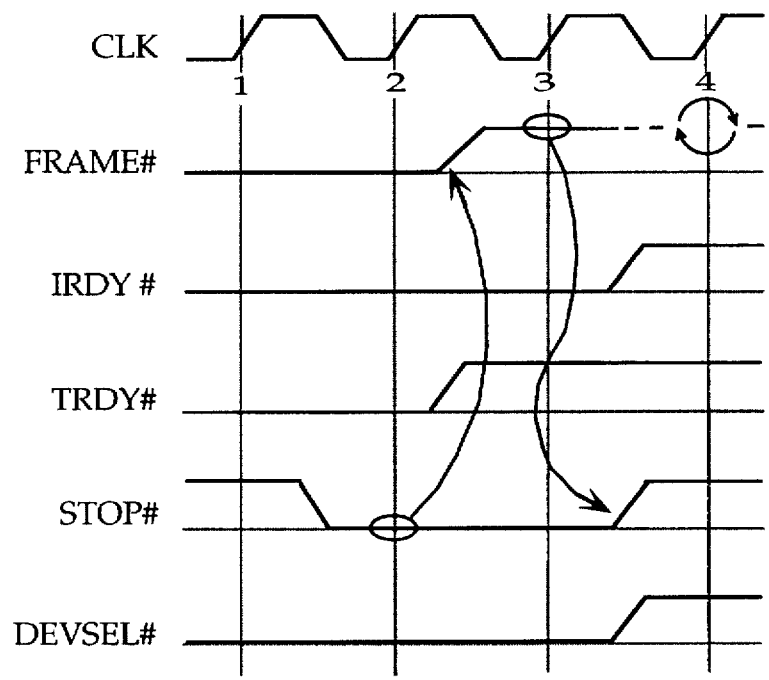
FIG. 10 illustrates a target initiated termination with data transferred before FRAME# is deasserted.
Figure 11:
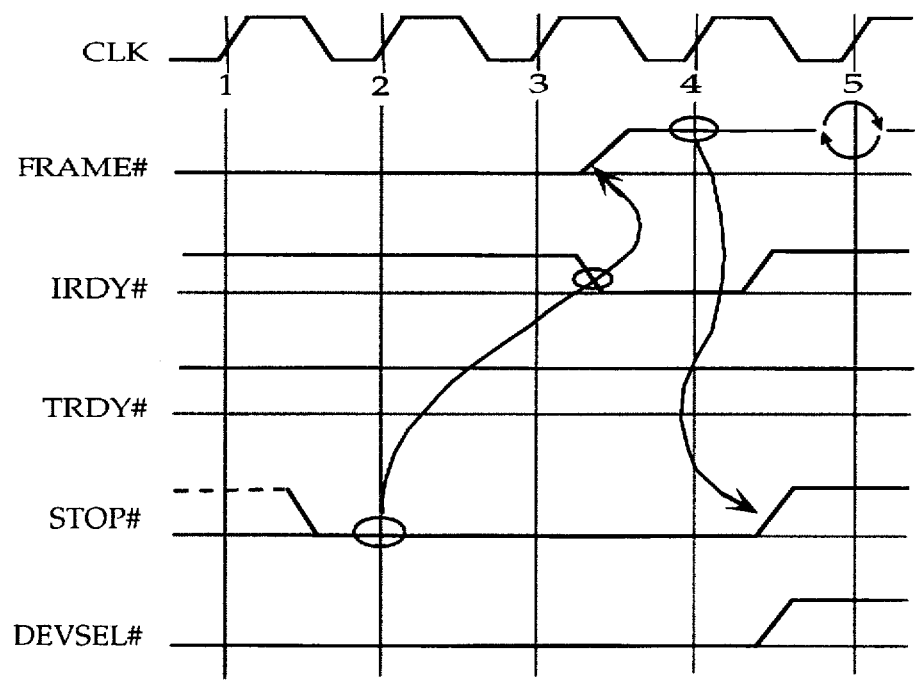
FIG. 11 illustrates a target initiated termination with data not transferred after STOP# is asserted.

Three examples of disconnect are shown in FIGS. 9–11. Each of them shows the same relationship between STOP# and FRAME#, namely that:

Disconnect is signalled by the target asserting STOP# and holding it asserted until it samples FRAME# high.

FRAME# is deasserted as soon as possible after STOP# is sampled asserted. FIG. 11 illustrates this taking an extra cycle because IRDY# could not be asserted immediately after STOP# was asserted.

STOP# is always deasserted the cycle immediately following FRAME# deassertion. In addition, these three disconnect examples of FIGS. 9–11 show that DEVSEL# is always asserted when STOP# is asserted; otherwise a target-abort is indicated.

The three examples of FIGS. 9–11 show three different possibilities for data transfer in association with a disconnect. Notice that the target can determine whether or not data is transferred after STOP# is asserted. Data transfer takes place on every cycle where both IRDY# and TRDY# are asserted, independent of the state of the STOP# signal. If the target wants to perform one more data transfer and then stop, it may assert TRDY# and STOP# at the same time.

In FIGS. 9–10, the examples are provided for two different disconnects, where data is transferred after STOP# is asserted. In both cases, the target declares its intent to perform another data transfer by having TRDY# asserted at the time STOP# is asserted. In FIG. 9, the data is transferred after FRAME# is deasserted (on clock 3) because the master was not ready (IRDY# deasserted on clock 2).

In FIG. 10, the data is transferred before FRAME# is deasserted (on clock 2). The target upon detecting that data transfer, removes TRDY# since it intended to transfer no more data. Notice that this means no data is transferred in the final data phase. If the target had kept TRDY# asserted during clock 3, then data would have been transferred on both clock 2 and clock 3. However, the target cannot depend on completing more than one data transfer after STOP# is asserted, as is demonstrated by the example of FIG. 9.

Once STOP# has been asserted by the target, it must stay asserted until FRAME# is sampled deasserted. If the target requires a wait cycle in the last data phase, it must delay the assertion of STOP# until it is ready to complete the transaction. FIG. 11 shows a case in which data is not transferred after STOP# is asserted because TRDY# is deasserted. Note that in this example, FRAME# deassertion is delayed until IRDY# could be asserted. This is also an example of retry, which is actually a special case of disconnect where no data transfer occurs at all. The most common example of retry is when the target is currently locked for exclusive access by another master. Another example is when the target needs to acquire access to some other non-peripheral component bus resource before allowing the transaction to proceed. (Care needs to be taken in this case to insure that there are no conditions where the retry itself could generate a deadlock condition.)

A master must retry any target terminated access at a later time starting with the address of the next untransferred data.

In summary, the following general rules govern FRAME#, IRDY#, and STOP# in all peripheral component bus transactions.

1. Whenever STOP# is sampled asserted, FRAME# must be deasserted as soon as possible pursuant to the rules for FRAME# deassertion (i.e., IRDY# must be asserted). FRAME# deassertion should not be delayed after STOP# by more than 2 or 3 cycles.

2. Once asserted, STOP# must remain asserted until FRAME# is sampled deasserted, whereupon STOP# muse be deasserted by the following clock edge.

3. During the final data phase of a transaction (FRAME# deasserted and IRDY# asserted), any clock edge on which either STOP# or TRDY# is asserted becomes the last cycle of the transaction, and IRDY# must be deasserted by the following clock edge. (This creates an idle cycle and defines the end of transaction.)

4. If TRDY# is ever sampled deasserted while STOP# is asserted, TRDY# must thereafter remain deasserted through the remainder of the transaction.

The present invention provides an exclusive access mechanism which allows non-exclusive accesses to occur during intervals of exclusive accesses when the bus is not in use. This is referred to as a resource lock. Resource lock allows future processors to hold a hardware lock across several instructions or accesses without interfering with non-exclusive, real time data transfer, such as video. The mechanism is based on locking only the resource to which the original locked access was targeted. This mechanism is fully compatible with existing software use of exclusion.

The LOCK# signal indicates an exclusive access is underway. The assertion of GNT# does not guarantee control of LOCK#. Control of LOCK# is obtained under its own protocol in conjunction with GNT#. Preferably, agents performing nonexclusive accesses are free to proceed even while another master agent retains ownership of LOCK#. However, the arbiter can optionally convert a resource lock into a complete bus lock by granting the agent that owns the LOCK# exclusive access of the bus until LOCK# is released.

In a resource lock, exclusivity of an access is guaranteed by the target agent of the access, not by excluding all other agents from accessing the bus. With this in mind, the following paragraphs describe the behavior of target and master agents in the resource based lock of the present invention.

All target agents that support exclusive accesses must sample LOCK# with address. The target of a transaction marks itself locked when LOCK# is sampled deasserted. A locked target remains in the locked state until FRAME# and LOCK# are both sampled deasserted on the same clock edge. A currently locked target may only accept requests when LOCK# is deasserted during the address phase. A currently locked target will respond by asserting STOP# with TRDY# deasserted (Retry) to all transactions when LOCK# is asserted during the address phase.

When a master performs an exclusive access, it asserts LOCK# the clock after the address phase and keeps it asserted to maintain control. A master may relinquish ownership of LOCK# at any time by deasserting LOCK#; however, it is preferable that LOCK# be deasserted when IRDY# is deasserted following the last data phase. This is because if the master releases LOCK# before the current access completes, the target may assert STOP# requesting the master to retry the access. If this occurs, the master no longer controls LOCK# and violation of exclusive access may occur.

When an agent needs to perform an exclusive operation, the agent senses the internal state of LOCK# before asserting REQ#. The master marks LOCK# busy anytime LOCK# is sampled asserted and not busy when both FRAME# and LOCK# are sampled deasserted.

While waiting for grant, the master continues to monitor LOCK#. If LOCK# is ever sampled busy, the master deasserts REQ#, because another agent has gained control of LOCK#.

When the master is granted access to the bus, and LOCK# is not busy, ownership of LOCK# has occurred. The master is free to perform an exclusive operation when the current transaction completes.

If an agent does not check LOCK# before asserting REQ#, the agent may gain access to the bus but not be able to proceed. The agent would then have to deassert REQ# and start the process over again. Because the agent deasserts REQ#, the arbiter would then deassert the GNT# of the agent and assert another grant before the next transaction may begin. This delay may degrade system performance.

Figure 12:
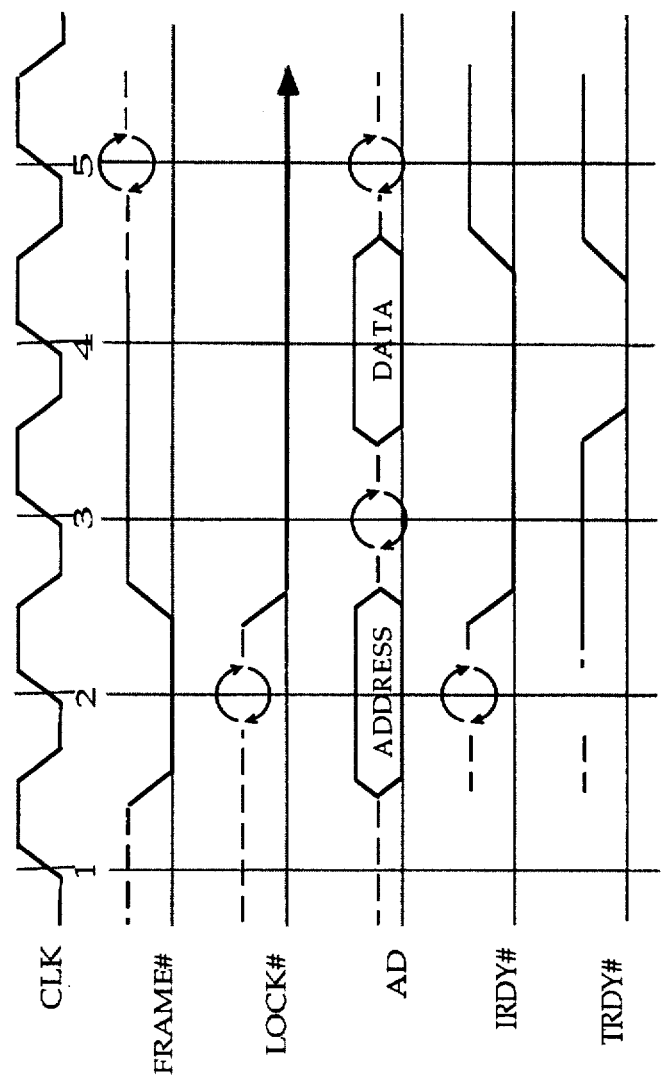
FIG. 12 illustrates the initiation of a locked cycle.

FIG. 12 illustrates the initiation of an exclusive access. The master asserts LOCK# at the clock following the address phase. By asserting LOCK#, the master retains ownership of LOCK# beyond the end of the current transaction.

A locked operation is not "established" on the bus until consummation of the first data phase of the first transaction (IRDY# and TRDY# asserted). If the target agent retries the first transaction without a data phase completing, not only must the master agent terminate the transaction, but the master must release LOCK#. Once the first data phase completes, the exclusive operation is established, and the master keeps LOCK# asserted until, either the lock operation completes, or an error (master or target abort) causes an early termination. In case of an abort the master agent must discontinue the exclusive operation and release LOCK#.

Non-exclusive access to unlocked target agents on the bus are allowed to occur while LOCK# is asserted. An unlocked agent will respond to an access with LOCK# active during the address cycle and remain unlocked. When the exclusive access is complete, LOCK# is deasserted and the other masters may vie for ownership.

Figure 13:
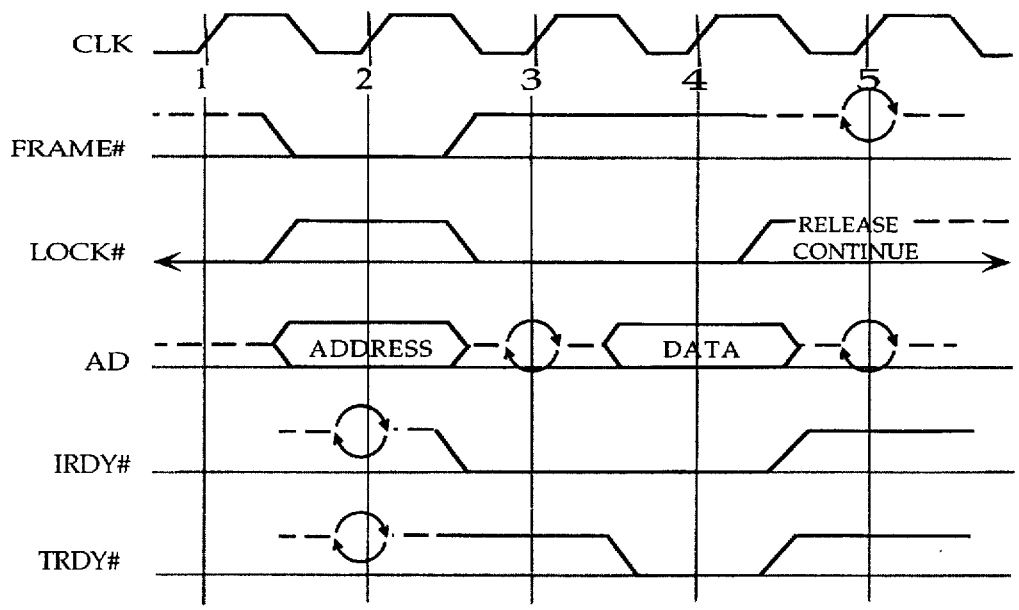
FIG. 13 illustrates a master continuing a locked cycle.

FIG. 13 shows a master continuing an exclusive access. However, this access does not complete the exclusive operation. When the master is granted access to the bus, it starts another exclusive access to the target it previously locked. The master deasserts LOCK# during the address phase indicating to the locked agent that this is a continuation of the exclusive access. The locked device accepts and responds to the request. The master re-asserts LOCK# following the address phase to maintain ownership.

Figure 14:
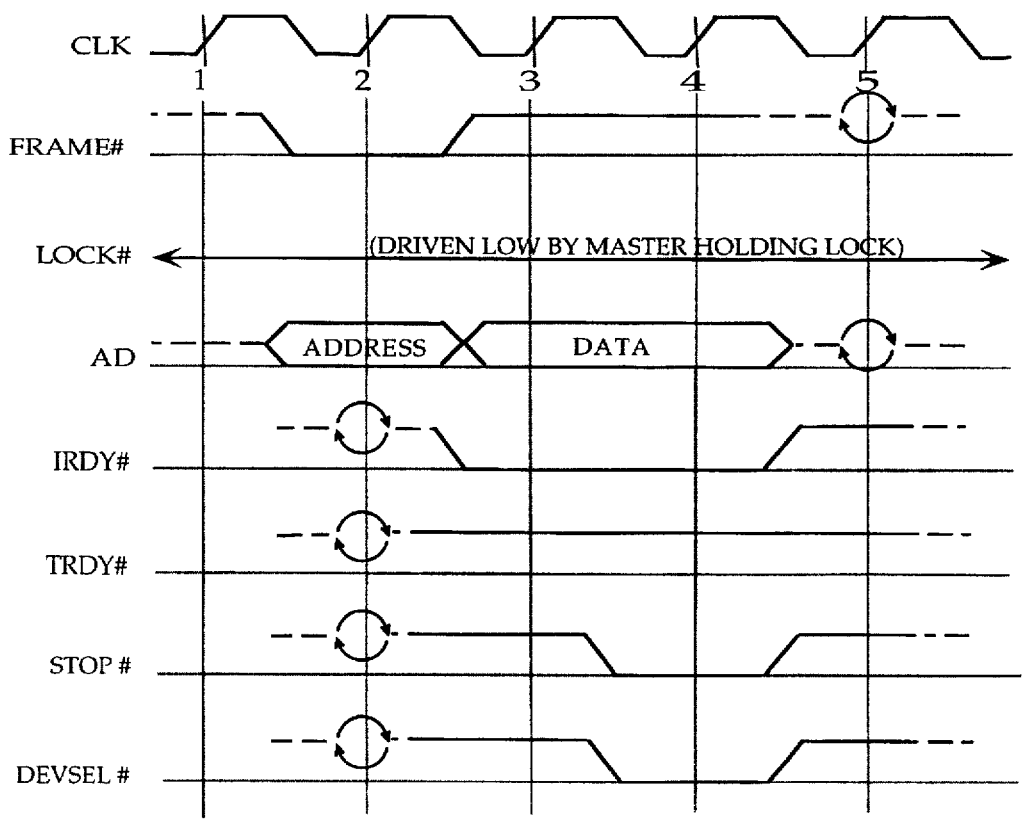
FIG. 14 illustrates a master attempting a non-exclusive access to a locked agent.

FIG. 14 shows a master trying a non-exclusive access to a locked agent. Notice LOCK# is asserted during the address phase. When the target samples LOCK# asserted, it signals RETRY termination and no data is transferred. An unlocked target ignores LOCK# when deciding if it should respond. Also, since, in this cycle LOCK# is asserted with FRAME#, an unlocked target does NOT go into a locked state.

During the final transfer of an exclusive operation, the master agent deasserts LOCK# during the address cycle so the target will accept the request, and then reasserts it until the exclusive access terminates successfully. A locked agent unlocks itself whenever LOCK# and FRAME# are deasserted.

The master that owns LOCK# can release it anytime by deasserting it. As noted earlier, the target of the access may signal retry before the access completes. If this happens, the exclusivity of the access is violated.

Finally, in the preferred embodiment of the present invention, if a master wants to execute two independent exclusive operations on the bus, it must insure one clock between operations where both FRAME# and LOCK# are deasserted. This insures any slaves locked by the first operation are released prior to starting the second operation. (An agent must unlock itself when FRAME# and LOCK# are both sampled deasserted on one clock edge.)

While the invention has been described in conjunction with the preferred embodiment and FIGS. 1–14, it is evident that numerous alternative modifications, variations and uses will be apparent to those skilled in the art in light of the foregoing description.

What is claimed is:

1. In a computer system including at least one master device and at least one slave device, a bus for permitting the master to write data to a target slave or read data from the target slave, the bus comprising:

a FRAME# signal line coupled to the at least one master device and coupled to the at least one slave device, for carrying a signal which is asserted by the master having control of the bus;

a DEVSEL# signal line coupled to the at least one master device and coupled to the at least one slave device, the target slave claiming the data transfer by asserting the DEVSEL# signal line, a bridge to a standard bus claiming the data transfer when the DEVSEL# signal line is not asserted;

a STOP# signal line coupled to the at least one master and coupled to the at least one slave device, for the designated target slave to indicate to the master with control of the bus that the data transfer must be terminated.

2. The bus for permitting the master to read data from a target slave or write data to a target slave as set forth in claim 1 wherein the data and address lines are the same lines and the data and address are multiplexed on the data and address lines such that the address is placed on the data and address lines at the beginning of the data transfer, and the data is placed on the data and address lines for the rest of the data transfer.

3. The bus for permitting the master to read data from or write data to a target slave as set forth in claim 1 wherein the control signal line is a plurality of signal lines and the control signal lines indicate the address space being used by the master with control of the bus is memory address space or input/output address space, as well as whether the data burst will be a read or a write operation.

4. The bus for permitting the master to read data from or write data to a target slave as set forth in claim 3 wherein the plurality of data signal lines can contain more than one datum of the data burst at a time and the control signal lines are used to indicate which of the plurality of data signal lines contain a valid datum during a transfer of data across the plurality of data signal lines.

5. The bus for permitting the master to read data from or write data to a target slave as set forth in claim 1 wherein a designated target slave indicates to the master with control of the bus that the data transfer should be terminated and not repeated by deasserting the DEVSEL# signal no later than the time that the designated target slave asserts the STOP# signal.

6. The bus for permitting the master to read data from or write data to a target slave as set forth in claim 1 further comprising:

a bus clock for providing a clock signal to synchronize the transfer of data, address and control signals across the bus, the data, address and control signals being valid on an edge of the clock signal; and, a clock signal line coupled to the clock, to each of the masters and to each of the slaves, the clock signal line relaying the clock signal of the bus clock to each of the masters and to each of the slaves.

7. The bus for permitting the master to read data from or write data to a target slave as set forth in claim 1 further comprising:

a bus arbiter for assigning control of the bus to only one of the masters at a time;

one bus grant line for every one of the masters, each bus grant line coupling the bus arbiter to one of the masters, the bus arbiter granting control of the bus by asserting the bus grant line of the master with control of the bus and not asserting the bus grant lines of the other masters.

8. The bus for permitting the master to read data from or write data to a target slave as set forth in claim 1 wherein the master with control of the bus has control of the bus at most until completion of a transfer of a burst of data to or from the target slave designated by the master with control of the bus.

* * * * *